United States Patent [19]
Droste et al.

[11] Patent Number: 5,218,661
[45] Date of Patent: Jun. 8, 1993

[54] DEVICE FOR DOUBLING THE FREQUENCY OF A LIGHT WAVE

[75] Inventors: Richard B. J. Droste; Ronald R. Drenten; Michiel J. Jongerius, all of Eindhoven, Netherlands

[73] Assignee: U.S. Philips Corp., New York, N.Y.

[21] Appl. No.: 787,990

[22] Filed: Nov. 5, 1991

[30] Foreign Application Priority Data

Nov. 6, 1990 [NL] Netherlands .................. 9002410

[51] Int. Cl.$^5$ .............................................. H03F 7/00
[52] U.S. Cl. ..................................... 385/122; 359/332
[58] Field of Search ................. 385/122; 372/21, 22; 359/326, 327, 328, 332

[56] References Cited

U.S. PATENT DOCUMENTS

| | | | |
|---|---|---|---|
| 5,011,250 | 4/1991 | Okada et al. | 385/122 |
| 5,036,220 | 7/1991 | Byer et al. | 385/122 |
| 5,052,770 | 10/1991 | Papuchon | 359/328 |
| 5,121,250 | 6/1992 | Shinozaki et al. | 359/328 |

FOREIGN PATENT DOCUMENTS 9004807  5/1990  PCT Int'l Appl. .

OTHER PUBLICATIONS

Vohra et al., Journal of Applied Physics, vol. 66, No. 11, Dec. 1, 1989 pp. 5161-5174 "Diffusion Characteristics and Waveguide Properties of Proton-Exchanged and Annealed LiNbO3 Channel Waveguides".

Primary Examiner—Frank Gonzalez
Attorney, Agent, or Firm—William L. Botjer

[57] ABSTRACT

A device for doubling the frequency of a light wave and having a satisfactory waveguide action is obtained in a simple manner by providing, in a nonlinear optical material 11, periodic domains 12 having a reduced second-order susceptibility and an increased refractive index relative to the nonlinear optical material by means of proton exchange or proton implantation. By means of a heat treatment, the refractive index of the material in the periodic domains is reduced to a value which is less than 0.10 higher than that of the nonlinear optical material, thus obtaining a low degree of light scattering.

3 Claims, 1 Drawing Sheet

DEVICE FOR DOUBLING THE FREQUENCY OF A LIGHT WAVE

BACKGROUND OF THE INVENTION

The invention relates to a device for doubling the frequency of a light wave, which device comprises a nonlinear optical medium for guiding a fundamental light wave while forming a second harmonic wave, said medium comprising a waveguide having a spatially periodic structure.

The invention also relates to a method of manufacturing a device for doubling the frequency of a light wave, which device comprises a waveguide having a spatially periodic structure.

The device according to the invention can be used, for example, in combination with a semiconductor laser light source which generates red light, as a compact blue light source for optical storage of information, for telecommunication and for laser printers. By virtue of the use of shortwave light, the information density can be increased and the possibilities of writing and erasing information are extended as a result of the larger photon energy.

In devices for doubling the frequency of a light wave the problem arises that the nonlinear optical medium has different refractive indices for the fundamental wave and the second harmonic wave, thus bringing about increasing phase differences between both waves when light is guided through the medium. Owing to destructive interference, a large part of the intensity of the generated blue light is lost. A possible solution to this problem is the use of a birefringent material whose ordinary refractive index at one wavelength should be equal to the extraordinary refractive index at another wavelength. Another solution which is known per se is the use of waveguides having spatially periodic structures. In the latter solution, the nonlinear optical properties in alternate regions are selected such that in regions where the fundamental light wave and the second harmonic wave are out of phase, the second harmonic light wave is generated to a reduced degree or not at all, so that no complete extinction takes place. It is even possible to change the nonlinear properties in such regions in a manner such that the generated blue light is of the opposite phase (domain inversion), so that a further intensification of the blue light takes place.

In PCT Patent Application WO 90/04807, a description is given of such a (domain inversion) device and of a method of manufacturing such a device, in which method domains of opposite ferroelectric polarity are manufactured under a mask layer in a nonlinear optical material by means of annealing. Said annealing treatment takes place at a temperature slightly below the Curie temperature which, for example, for lithium niobate is approximately 1200° C. To obtain sufficient waveguide action in the above device, it is necessary to subsequently locally increase the refractive index, for example, by means of diffusion of protons.

A disadvantage of the known method is the high-temperature annealing treatment (causing the formation of colour centres in the material) and the necessity to carry out both process steps in a patterned manner, i.e. via two masks. The use of one single mask for both steps leads to a waveguide which is segmented according to the domain structure. Investigations leading to the invention have shown that in such a segmented waveguide, light scattering takes place at the interfaces between the domains (grating effect). A further disadvantage of the known device and method is that domain inversion is possible only on the $c^+$ crystal face of lithium niobate. However, in the $c^+$ crystal face etching takes place to an undesirable degree during the proton diffusion process.

SUMMARY OF THE INVENTION

It is an object of the invention to provide, inter alia, a device for doubling the frequency of a light wave, which device has a satisfactory waveguide action and a low degree of light scattering. A further object of the invention is to provide a device which can be manufactured in a simple and reliable manner and in which the optical properties can be adapted within wide limits to the desired application of the device. For this purpose, it is an object of the invention to provide a simple and efficient method of manufacturing such a device, in which method, in particular, only one of the process steps has to be carried out in accordance with a pattern. A still further object of the invention is to provide a method in which no high temperatures (higher than, for example, 500° C.) need be used, so that damage to the nonlinear optical material is precluded.

According to the invention, this object is achieved by a device as described in the opening paragraph, the waveguide consisting of a nonlinear optical material in which periodic domains having a reduced second-order susceptibility and an increased refractive index relative to the nonlinear optical material are provided by means of proton exchange or proton implantation, the increase of the refractive index being less than 0.10. Preferably, the increase of the refractive index in the domains is 0.02 to 0.06, for example on average about 0.05.

Materials which are known per se such as potassium titanyl phosphate $KTiOPO_4$ and potassium lithium niobate $K_3Li_2Nb_5O_{15}$ can be used as the nonlinear optical material. In a device according to the invention, the best results were obtained when the nonlinear optical material consists of lithium niobate $LiNbO_3$ or lithium tantalate $LiTaO_3$.

According to the invention, the object of providing a method of manufacturing such a device is achieved by a method in which, in a nonlinear optical material, periodic domains having a reduced second-order susceptibility and an increased refractive index relative to the nonlinear optical material are provided by means of proton exchange or proton implantation, after which a heat treatment is used to reduce the refractive index of the material in the periodic domains to a value which is less than 0.10 higher than that of the nonlinear optical material.

In a very suitable embodiment of the method according to the invention, the periodic domains are provided by means of proton diffusion from pyrophosphoric acid $H_4P_2O_7$ via a mask layer of tantalum Ta.

In a preferred embodiment of the method according to the invention, the heat treatment is carried out in an oxygen atmosphere at a temperature exceeding 200° C. The choice of a higher temperature results in a shorter duration of the heat treatment. However, in order not to damage the material, the temperature used is not too high, for example, for lithium niobate the temperature is below 500° C..

The invention is based on the phenomenon that the second-order susceptibility of a nonlinear optical material can be greatly influenced by means of proton exchange or proton implantation. Thus, the nonlinear coefficient $d_{33}$ in lithium niobate can be reduced from 40 pm/V to a value below 20 pm/V. In a domain structure, this can be used to locally strongly reduce the formation of the second harmonic wave, as described in the opening paragraph.

It is known per se to use proton exchange or proton implantation for the manufacture of waveguides in lithium niobate and lithium tantalate, see for example the article by S. T. Vohra et. al. in Journal of Applied Physics 66 (11), pages 5161-5174 (1989). As a result of the in-diffusion of protons, the extraordinary refractive index of lithium niobate increases from 2.17 to approximately 2.33 at the surface, the average value in the diffused area being 2.29. When a segmented waveguide is used, as is the case in a device according to the invention, said relatively large refractive index differences (0.16 at the surface, average value 0.12) lead to a high degree of light scattering caused by a grating effect at the boundaries of the diffused regions.

The invention is based on the insight gained that smaller refractive index differences suffice to attain the desired waveguide action, and that light scattering can be reduced. To attain smaller refractive index differences, use can be made of a heat treatment, for example, at temperatures below 500° C. (which is far below the Curie temperature which in the case of lithium niobate is approximately 1200° C.). By virtue of the heat treatment, the refractive index differences at the surface decrease to approximately 0.07, the average value in the diffused areas being approximately 0.05. The heat treatment leads to a slight expansion of the diffused areas. The heat treatment also leads to a slight increase of the nonlinear coefficient $d_{33}$ in the diffused areas, but the value of said coefficient remains suitable for effectively doubling the frequency.

By combining a small increase of the refractive index with a substantial decrease of the nonlinear optical properties, as reflected in the second-order susceptibility and the nonlinear coefficient $d_{33}$, a device is obtained in which light scattering remains below acceptable levels and in which the extinction in the periodic domains is limited such that a useful light output can be obtained by using a device of sufficient length (for example a few millimeters). A particular advantage of the device obtained by the method according to the invention is the low sensitivity to radiation damage when laser light having a high intensity is irradiated. Another advantage of the method and device according to the inventive method consists in the possibility of manufacturing the device on the c⁻crystal face of lithium niobate, in which less etching occurs during the proton diffusion process than in the c⁺crystal face.

BRIEF DESCRIPTION OF THE DRAWING

The invention will be explained in greater detail by means of an exemplary embodiment and with reference to the accompanying drawing, in which.

DESCRIPTION OF THE PREFERRED EMBODIMENTS

Figure 1:
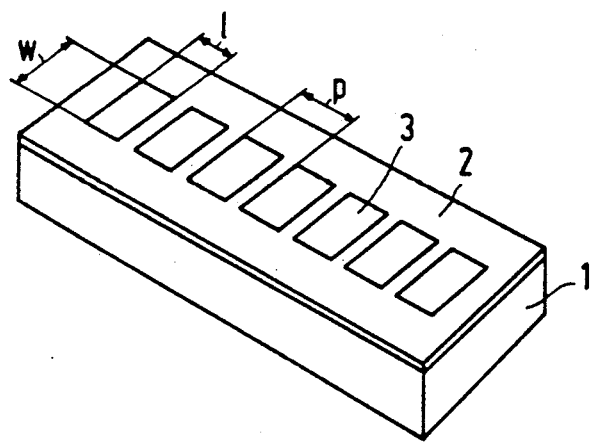
FIG. 1 is a diagrammatic elevational view of an embodiment of the device according to the invention.

According to the example, a device for doubling the frequency of a light wave is manufactured from a lithium niobate crystal. A 100 nm thick tantalum layer is applied to the c⁻crystal face by sputtering. Using photolithographic methods which are known per se, apertures are formed in the tantalum layer, for example, by exposing and dissolving a photoresist layer having the composition HPR 204, followed by reactive ion etching of the tantalum and removal of the excess photoresist. The result is diagrammatically shown in FIG. 1 in which reference numeral 1 denotes a lithium-niobate crystal carrying a mask layer 2 of tantalum in which apertures 3 are formed. Said apertures have a width w, a length 1 and, according to the example, are provided in a single straight line with a period p. Other configurations which are known per se can also be used in the device according to the invention.

The above-mentioned crystal with the mask layer is immersed in a bath of pyrophosphoric acid at a temperature of 228° C. for 60 minutes, in which process diffusion of protons into the lithium niobate takes place. The temperature, which is selected between for example 200° and 300° C., and the diffusion time, for example 15 to 20 minutes, determine together the diffusion depth which in the device according to the invention is approximately 1 µm. Instead of an immersion process, an alternative method may be applied in which a layer of pyrophosphoric acid is spin coated onto the crystal and subsequently heated for the time necessary to bring about diffusion. It is alternatively possible to use other known means of providing the desired quantity of protons, for example by means of diffusion from benzoic acid or by ion implantation.

After the diffusion step, the tantalum mask is removed, for example wet-chemically in a mixture composed of 4 vol % of hydrofluoric acid (concentration 50%), 4 vol % of nitric acid (concentration 65% and 4 vol % of acetic acid (concentration 100%), the remainder being water.

Figure 2:
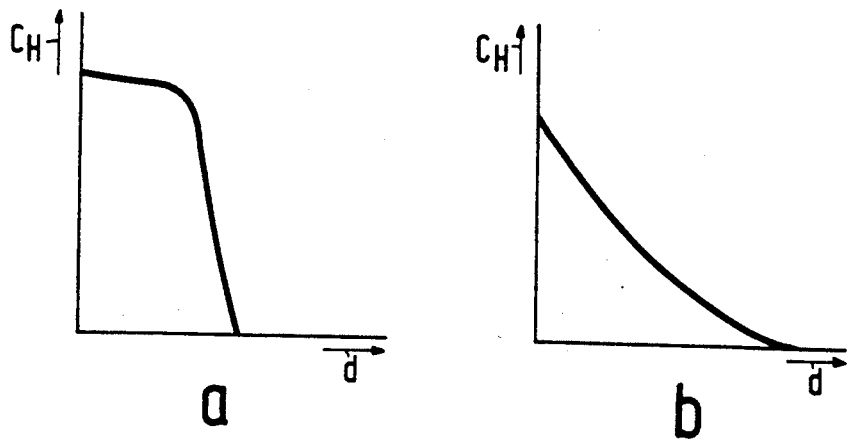
FIGS. 2a and 2b show the proton concentration $c_H$ as a function of the depth d under the surface, respectively, before (a) and after (b) the heat treatment.

Subsequently, a heat treatment is carried out in oxygen, according to the example, for 1 to 3 hours at 300° C. The temperature may be selected between, for example, 200° and 500° C., the duration of the heat treatment, between for example 10 minutes and 20 hours, having to be adapted accordingly to attain the desired result. The effects of the heat treatment are explained with reference to FIG. 2. FIG. 2a shows the proton concentration $c_H$ as a function of the depth d under the surface of the lithium-niobate crystal, after the diffusion step and before the heat treatment. The variation in concentration broadly exhibits a stepped profile with sharp transitions. Further investigations have shown that proton diffusion takes place substantially isotropically and that it may also occur, to a certain degree, under the edges of the mask. When the diffusion process is carried out for a long time and the dimensions and interspaces in the mask pattern are suitably selected, the diffused areas may partially overlap, if desired.

After the heat treatment, see FIG. 2b, the proton concentration gradually decreases as the depth d increases, so that the refractive index differences between the diffused areas and the unchanged lithium niobate present between said areas is reduced. By virtue of the absence of sharp transitions, light scattering in the device thus manufactured is substantially reduced. This permits suitable results to be obtained at relatively large dimensions of the segmented waveguide, for example at a length up to 5 mm. If, in the method according to the invention, the heat treatment is not carried out in the indicated manner, the degree of light scattering is so large that the fundamental light wave is extinguished after a length of 1 mm. Besides, in that case also the generated blue light is scattered in the substrate.

According to the example, the ratio l/p was 0.5. Various combinations of the other dimensions were used, in which p and w had individual values of 2, 2.5, 3, 4 and 6 μm. The dimensions of the apertures in the mask (and hence of the diffused areas) can be adapted, according to relations which are known per se, to the desired optical properties of the device, in particular to the wavelength at which frequency doubling should occur.

Figure 3:
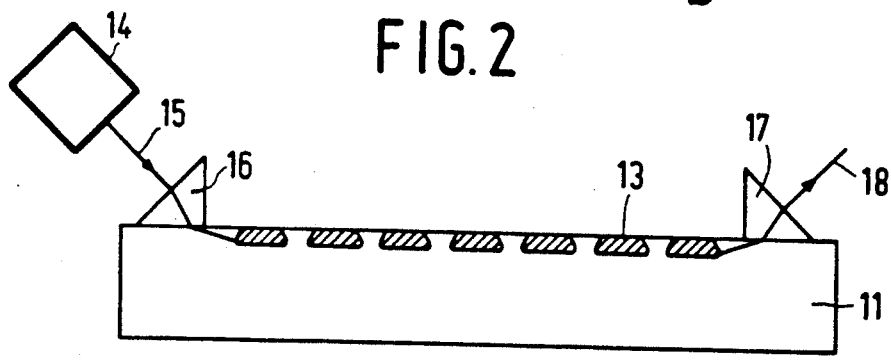
FIG. 3 is a diagrammatic cross-sectional view of an embodiment of the device according to the invention.

FIG. 3 diagrammatically shows the application of a device according to the invention. The crystal 11 of lithium niobate comprises domains 13 into which protons are diffused, resulting in an increase of the refractive index at the location of said domains and a weakening of the nonlinear optical properties. A semiconductor laser light source 14 is used to generate a light ray 15, for example of red or infrared light, which light ray is coupled into the lithium-niobate crystal via an input prism 16. Said light ray is transferred to an output prism 17 via the segmented waveguide consisting of domains 13. The outgoing light ray 18 contains a quantity of light, for example blue light, the frequency of which has doubled relative to the ingoing light ray. If desired, the red light can be obstructed at the location of the outgoing light ray by means of a filter which is not shown in the Figure.

According to a particular example, the length l of the domains is 1.25 μm, the width w is 2.5 μm and the period p is also 2.5 μm. At an overall length of the segmented waveguide of 3.5 mm, a light output of 100 μW of blue light (having a wavelength of 412 nm) was obtained at a quantity of red light coupled-in (wavelength 824 nm) of 40 mW. An increase of the accuracy of the dimensions and period of the domains (tolerance within 10 nm) theoretically permits, under the stated conditions, to generate a quantity of 1 to 2 mW of blue light.

Figure 4:
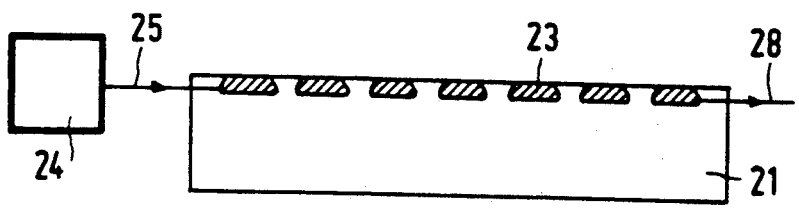
FIG. 4 is a diagrammatic cross-sectional view of an alternative embodiment of the device according to the invention.

FIG. 4 diagrammatically shows an alternative device according to the invention. A crystal 21 of lithium tantalate comprises domains 23 into which protons are diffused, causing the refractive index to increase at the location of said domains and the nonlinear optical properties to weaken. A semiconductor laser light source 24 is used to generate a light ray 25, for example of red or infrared light, which light ray is coupled into the lithium-tantalate crystal via an end face of the crystal 21. Said light ray is transferred to an opposite end face of the crystal via a segmented waveguide comprising domains 23. The outgoing light ray 28 contains a quantity of light the frequency of which has doubled relative to the ingoing light ray.

We claim:

1. A device for doubling the frequency of a light wave, which device comprises a nonlinear optical medium for guiding a fundamental light wave while forming a second harmonic wave, said medium comprising a waveguide having a spatially periodic structure, characterized in that the waveguide consists of a nonlinear optical material in which periodic domains having a reduced second-order susceptibility and an increased refractive index relative to the nonlinear optical material are provided by means of proton exchange or proton implantation, the increase of the refractive index being less than 0.10.

2. A device as claimed in claim 1, characterized in that the increase of the refractive index in the domains is 0.02 to 0.06.

3. A device as claimed in claim 1, characterized in that the nonlinear optical material consists material selected from the group of lithium niobate $LiNbO_3$ and lithium tantalate $LiTaO_3$.

* * * * *